United States Patent [19]
Spoo et al.

[11] Patent Number: 5,336,526
[45] Date of Patent: Aug. 9, 1994

[54] PRIMARY PROCESSING OF LAMINATED THERMOPLASTIC SHEETS

[75] Inventors: Kevin J. Spoo; Roy G. Thompson, both of Bartlesville, Okla.

[73] Assignee: Phillips Petroleum Company, Bartlesville, Okla.

[21] Appl. No.: 684,105

[22] Filed: Apr. 12, 1991

[51] Int. Cl.$^5$ .............................. B05D 1/32
[52] U.S. Cl. .................... 427/372.2; 427/316; 427/318; 427/385.5; 427/388.1; 427/389.8; 427/393.5; 427/398.1
[58] Field of Search ............. 427/316, 318, 385.5, 427/388.1, 389.8, 393.5, 398.1, 272.2

[56] References Cited

U.S. PATENT DOCUMENTS

| | | |
|---|---|---|
| 2,220,096 | 11/1940 | Greene ............................ 219/35 |
| 2,224,945 | 12/1940 | Ames ............................... 219/35 |
| 3,752,643 | 8/1973 | Robertson ...................... 432/120 |
| 4,628,895 | 12/1986 | Sautilli ............................ 126/25 |

*Primary Examiner*—Bernard Pianalto
*Attorney, Agent, or Firm*—George E. Bogatie

[57] ABSTRACT

In an on-line annealing process for rigid laminated sheets of reinforced thermoplastic material wherein an annealing chamber is maintained at a desired temperature by introducing heated air to impinge on a deflection plate within the annealing chamber, annealing of the thermoplastic sheets is improved by introducing heated air through a pair of elongated perforated tubes within the annealing chamber so that heated air is diffused so as to flow evenly across both sides of the rigid thermoplastic sheet as the sheet passes through the annealing chamber.

7 Claims, 2 Drawing Sheets

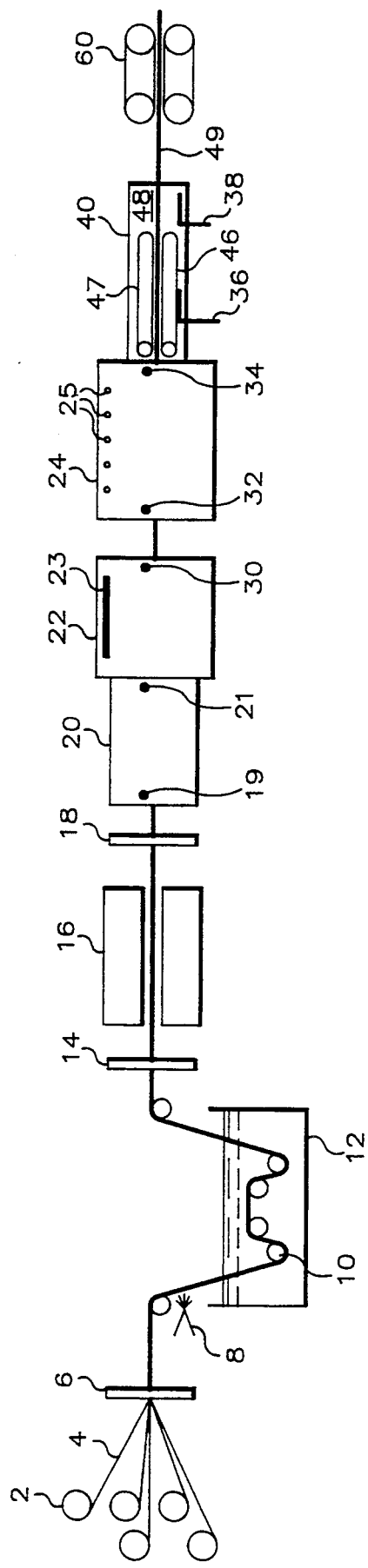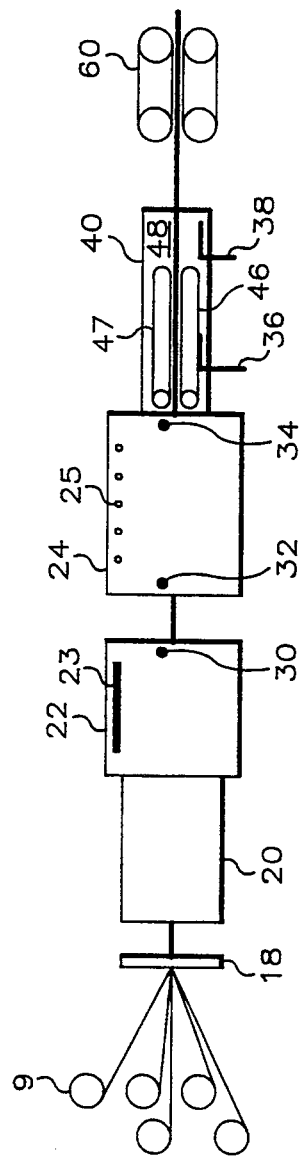
FIG. 1
FIG. 2

PRIMARY PROCESSING OF LAMINATED THERMOPLASTIC SHEETS

This invention relates to thermoplastic laminates. In one aspect it relates to improving physical properties of reinforced laminated plastics. More specifically, it relates to a process for improving properties of laminated thermoplastic sheets, containing bonded or coated fibers, wherein annealing of the sheets is incorporated in a continuous production operation.

BACKGROUND OF THE INVENTION

Thermoplastic matrix composites are processed by first heating the solid resin to flow temperature, at which time the flowing plastic can be formed to the desired shape, and then chilling the formed material to set it. In a continuous reinforced thermoplastic laminating operation, simultaneous heating and application of pressure, or cooling and application of pressure, or any sequence of these can be applied to the laminate as required.

With a common use of polymer or thermoplastic laminated sheets in many structural applications for automotive components such as bumpers, instrument panels, seat and body panels, and further use in a non-automotive application, such as household and sanitary appliances; the production of fiber reinforced polymer laminates by the use of an automated pultrusion machine for continuous laminating has been well established.

Pultrusion is a primary fabrication process which can be used for making continuous length filament reinforced plastic composites wherein two or more flat layers of material are bonded together. In one known thermoset pultrusion process multiple layers of a fiber roving are pulled from creels impregnated with a solution of resin, monomer, fillers and wetting agents; passed through a preformer where excess resin is squeezed off the roving with precise control for uniformity, and given a final shaping and curing in a heated die. The pulling mechanism located in the process after the curing die causes the roving to be pulled through the processing system. Although the majority of pultruded products are formed from polyester resins reinforced with glass fiber, other fibers such as carbon, aramid, (aromatic polyamide), metal, or hybrid fibers which involved more than one type of fiber have also been used as reinforcements; and such thermoset resin as vinyl ester and epoxy have seen use as a matrix material.

More recently, thermoplastic resins have been used as a matrix material in the pultrusion process. In processing thermoplastic material, the pultrusion process is similar to that for thermoset material, except that the curing concept does not apply and use of a cooling die, which is optional for thermoset materials, is required for thermoplastic processing.

The present invention is primarily concerned with producing reinforced laminated sheets using poly(arylene sulfide) as the matrix material in a pultrusion process. Using poly(arylene sulfide) as the matrix material provides pultruded products which will have advantages over the same products made from other materials such as thermoset plastics, steel, wood or aluminum. The poly(arylene sulfide) products are lightweight, can be designed for the strength and stiffness desired, are non-rusting, are corrosion resistant to numerous chemicals and gases, are electrical insulators and have low thermal conductivity.

Because poly(arylene sulfide) forms a semi-crystalline polymer structure, parts manufactured by the pultrusion process using poly(arylene sulfide) reinforced with glass or carbon fibers have widely varying percentages of crystallinity throughout the laminated sheet. The percentage of crystallinity in a poly(arylene sulfide) laminate varies with the line speed, laminate thickness, reinforcement fiber layers, and temperature profile used in producing the laminated sheet. Accordingly, the percent increase in crystallinity of the pultruded laminate achieved by annealing is highly indicative of the percent improvement in the physical properties. Since higher levels of crystallinity improve the quality of the laminate, any annealing process which can increase crystallinity of the laminate is highly desirable.

In the past, it has been typical to provide on-line annealing for shaped polymer products in pultrusion processes by annealing the shaped product as it is pulled through a heated chamber. In this annealing step, the annealing temperature is achieved by introducing a strong blast of heated air, such as from a hot air welding pistol, into the annealing chamber. The article being annealed is protected from the blast of hot air by directing the blast to impinge on a deflector shield. While the above described method of heating the annealing chamber has provided effective annealing temperatures for various shaped articles, the heating method occasionally causes uneven heating for some articles. Uneven heating is indicated by hot spots found on certain shaped articles, such as flat laminated sheets.

It is a primary object of this invention to provide a thermoplastic laminated sheet having improved physical properties.

It is another object of this invention to provide a laminated sheet having improved structural characteristics wherein the improved structural characteristics are achieved in a safe, simple, economic and expedient manner.

It is another object of this invention to provide improved continuous on-line annealing of a pultruded laminated sheet of fiber strands impregnated with poly(arylene sulfide).

SUMMARY OF THE INVENTION

In accordance with the present invention we have discovered that the physical properties of a rigid laminated sheet of reinforced poly(phenylene sulfide) can be improved by annealing the rigid laminated sheet in a heated chamber attached to a pultrusion machine and wherein heating of the rigid laminated sheet to the annealing temperature is accomplished by evenly flowing a gaseous heating medium over both the upper and lower surfaces of the laminated sheet as the sheet moves through the annealing chamber.

In a preferred embodiment the annealing chamber is provided with a pair of elongated perforated tubes for diffusing the gaseous heating medium over the surface of the sheets. Preferably, the perforated tubes are formed by a plurality of U-bend sections arranged in a generally sinusoidal shape with the perforated tube extending along a significant length of the annealing chamber.

Other aspects, objects and various advantages of the present invention will become apparent upon study of the specification and the appended claims along with the drawings in which:

BRIEF DESCRIPTION OF THE DRAWINGS

FIG. 1 is a schematic representation of the pultrusion process using a resin bath with the on-line annealing process of the present invention.

FIG. 2 is a schematic representation of the pultrusion process using the prepreg with the on-line annealing process of the present invention.

DETAILED DESCRIPTION OF THE INVENTION

Figure 3:
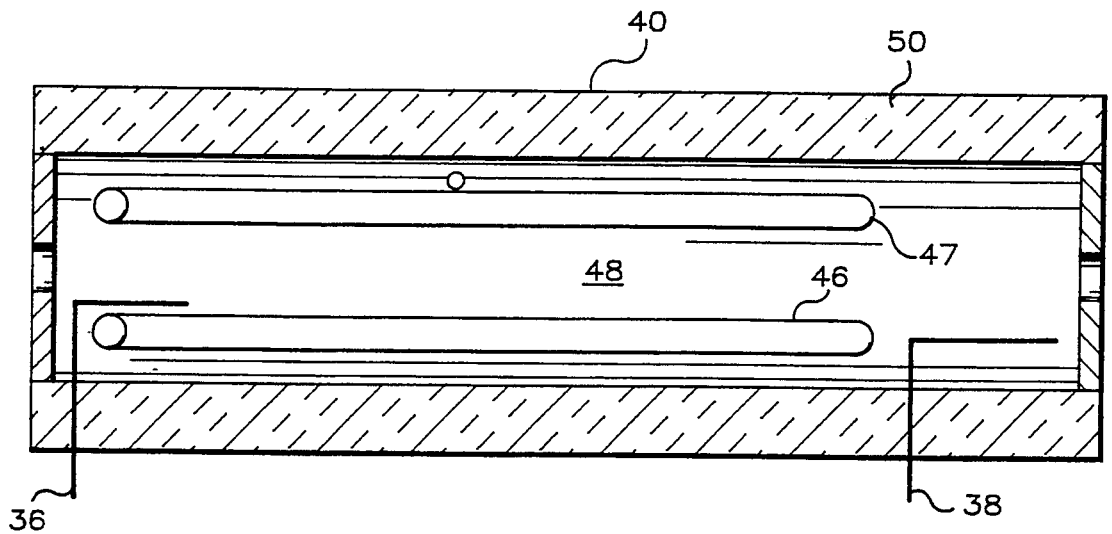
FIG. 3 is a longitudinal cross section of the annealing apparatus according to this invention.

While the present invention may be used in any plastic pultrusion process for forming shaped articles in which annealing would enhance the physical properties of the product, it is particularly applicable to pultrusion of flat laminated sheets of fiber reinforced poly(phenylene sulfide) and is described in terms of a flat laminated product. The term poly(phenylene sulfide) includes homopolymers and copolymers containing ortho-, meta- and/or paraphenylene linkages between sulfide groups in the polymer chain. Also included are aryl-substituted derivatives of these materials.

Annealing of poly(phenylene sulfide) is disclosed, for example, in U.S. Pat. No. 3,562,199 issued to Hill, Jr. et al., the disclosure of which is incorporated herein by reference. According to the aforementioned patent there is illustrated a process for improving the physical properties of poly(phenylene sulfide) polymer compounds, which are partially crystallizable, by annealing the polymer within a specific temperature range which is between the second order transitional temperature of the polymer as a lower limit and the crystalline melting point of the polymer as a upper limit. In this temperature range reversible changes occur in an amorphous region of a partially crystalline polymer from a rubbery condition to a hard and relatively brittle one. In general, the annealing can be accomplished between a temperature of about 93° C. to about 282° C. A more preferred temperature range is from about 110° C. to about 275° C. in a time period from about 15 minutes to about 50 hours.

In accordance with the present invention a process is provided for annealing a reinforced laminated poly(phenylene sulfide) sheet in conjunction with continuous production of the laminate.

Referring now to FIG. 1., multiple layers of reinforcing fiber strands 4 are drawn from creels 2 and passed through a roving guide 6 and optionally past a spray nozzle 8. Each strand is passed around several redirect bars 10 which cause spreading of the fiber strands in a bath 12 containing a slurry of a thermoplastic material as a powder in a liquid carrier such as water. Alternatively, the fiber strands may be contacted with a dry powder.

The reinforcing fiber strands 4 are preferably selected from the group consisting of ceramic fibers, glass fibers, carbon fibers, aramid fibers, metal fibers or hybrid fibers of one or more of these materials. A variety of thermoplastic materials can be utilized as a matrix material. Examples of such thermoplastic material are poly(arylene sulfide), nylons, polyetheretherketones, polyolefins, poly(arylene sulfide ketones) and the like. More preferably, poly(phenylene sulfide) is used.

The layers of impregnated fiber strands are then pulled through a guide mechanism 14 for alignment of the passage through a heated drying chamber 16 which removes the slurry diluent leaving a dry strand impregnated with solid thermoplastic material which is then pulled through 1 or more preformers 18 and then further pulled through a preheating chamber 20 so that the thermoplastic impregnated strand is aligned and preshaped on passing into a heated die 22.

The polymer containing reinforcing strands is heated to a temperature above the melting of the thermoplastic matrix material so as to fuse the layers and form a laminate in the preheating chamber 20. The preheating chamber 20 may be provided with one or more thermocouples 19 and 21 for monitoring the temperature. The laminate is then passed to a heated slot-shaped die 22 where temperature is allowed to drop along the path of the laminate being pulled through the heated die 22, to a temperature that is just sufficient to maintain at least a portion of the polymer in a molten state as it exits the heated die 22. Controller means (not illustrated) for providing heat to the preheating chamber 20 and heated die 22 may manipulate electrical strip heaters 23. Alternatively hot oil, hot air, cartridge heaters or other heating sources may be utilized.

In lieu of the above-described temperature gradient in heated die 22, the die 22 may have a uniform temperature provided that the temperature is sufficient to completely melt the thermoplastic material and allow it to exit the die at a temperature at which the thermoplastic material is still deformable. For example, when the thermoplastic matrix material is poly(phenylene sulfide), the temperature of the heated forming die 22 can be a uniform temperature such that the thermoplastic material is melted and the laminate exits the die at a temperature of approximately 325°–400° C.

The formed laminate is then drawn to a die 24 which is cooled by water circulation in ducts 25. Alternatively, the cold die 24 may be cooled by air convection or allowed to remain at a steady state temperature. The die 24 is maintained at a temperature sufficiently below the melting point of the matrix polymer to allow the temperature of the laminate exiting the cold die 24 to be below the melting point of the thermoplastic matrix polymer. The required cold die temperature is a function of such factors as line speed and cross sectional area of the pultruded laminate. Thermocouples 32 and 34 may be used to monitor temperature in the die 24.

Upon exiting from the cool die 24, the reinforced polymer, which is preferably in the form of a rigid laminated sheet, is drawn into the annealing chamber 40 where it is heated to a temperature near or above the glass transition temperature of the matrix polymer, but below the melting point of the polymer.

The annealing chamber 40 defines an annealing zone 48 where the temperature is maintained at the selected level by injecting a heated gaseous fluid, such as air, from any suitable source having sufficient capacity for heating the laminate to the annealing temperature. The heated air is diffused by the perforated tubes 46 and 47 so as to flow across the surface of the rigid laminated sheet 49 as the sheet moves through the chamber 40. One or more thermocouples such as those illustrated at 36 and 38 in communication with the atmosphere inside the annealing zone 48 are provided to monitor temperature. The heated gaseous fluid source is preferably provided with a means for adjusting fluid temperature levels (not illustrated) to obtain desired temperature levels in the annealing zone 48.

The laminated plastic sheet is drawn through the illustrated apparatus by use of the gripping/pulling mechanism 60 of the type commonly used in pultrusion processes. In a presently preferred embodiment, the plastic laminate sheet 49 is pulled at a rate from about 4 inches per minute to about 120 inches per minute through the annealing zone 48 with a temperature of the atmosphere in the annealing zone 48 maintained in the range from about 60° C. to about 320° C. when a poly(phenylene sulfide) matrix is used. More preferably, the laminate is pulled at a rate of from about 4 inches per minute to about 120 inches per minute through the annealing zone 48 of the process with the temperature of the atmosphere in the annealing enclosure maintained in the range of from about 90° C. to 275° C. when a poly(arylene sulfide) matrix is used. Most preferably the sheet 49 is to be pulled at a rate of from about 4 inches per minute to about 10 inches per minute through the annealing step of the process with the temperature of the atmosphere in the annealing zone 48 maintained in the range from about 90° C. to 275° C. when a poly(phenylene sulfide) matrix is used.

In an alternative embodiment illustrated in FIG. 2, which differs only slightly from that in FIG. 1, fiber reinforced thermoplastic materials already in the form of tape prepregs, rods or sheets can be provided for processing. Referring now to FIG. 2, where like reference numerals are used for the same part which may appear in both FIG. 1 and FIG. 2, poly(phenylene sulfide) prepregs on rolls 9 are passed through a preformer guide 18 and then to a preheating chamber 20. The heated metal die 22 is positioned so that the polymer exiting the preheating chamber 20 will enter the heated die 22, which is shaped and sized to process the desired combination of prepreg feeds to produce a desired output laminate. The temperature of the heated die 22 is maintained sufficiently above the melting point of the matrix polymer to allow a complete and thorough melting, shaping and fusion of the prepreg feeds into the desired laminates. This temperature is a function of parameters such as mass per unit time throughput.

FIG. 2 further illustrates a cold die 24 positioned so that the polymer exiting the heated die 22 will next pass through the cold die 24 which is cooled by water circulation through ducts 25. Alternatively, the cold die 24 may be cooled by air convection, or remain uncooled. The cold die 24 is kept at a temperature sufficiently below the melting point of the matrix polymer to allow the temperature of the composite material exiting the cold die 24 to be below the melting point of the matrix polymer. The required cold die temperature 24 is a function of such factors as line speed and cross sectional area of the plastic laminate. Referring still to FIG. 2, attached to the cold die 24 by any suitable means is an annealing chamber 40, having a pair of perforated tubes 46 and 47 within the annealing chamber which extend over a significant length of the zone 48. Hot air is injected into the chamber 40 through the perforated tubes 46 and 47. In a manner similar to that described with reference to FIG. 1, the heated air is diffused by the tubes 46 and 47 so as to flow over the surfaces of the laminate 49 as it moves through the annealing zone 48. The heated gaseous fluid source may be provided with a means (not illustrated) for adjusting fluid temperature levels to obtain desired temperature levels for the atmosphere in the annealing zone 48. The pulling device 60 comprises reciprocating hydraulic pullers, such as those manufactured by a company named Pultrusion Technology, and which are commonly used in pultrusion operations. The annealing chamber 40, which defines the annealing zone 48, is shown in cross section in FIG. 3. This chamber is a hollow enclosure which may be of a cylinder, rectangular or some other multisided shape. Generally, the annealing chamber 40 is up to 48 inches in length and of any suitable cross section. Presently preferred dimensions for the annealing chamber for forming laminated sheets are a length from about 12 inches to about 18 inches and a rectangular cross section having a width of from about 4 to 24 inches. Presently more preferred is an annealing chamber from about 12 inches to about 18 inches in length and a width of from about 6 to 20 inches.

The annealing chamber 40 is provided with one or more thermocouples, 36 and 38, illustrated in FIG. 3, for monitoring the temperature of the atmosphere in annealing zone 48. The annealing chamber 40 may optionally be jacketed with an appropriated insulating material 50.

Figure 4:
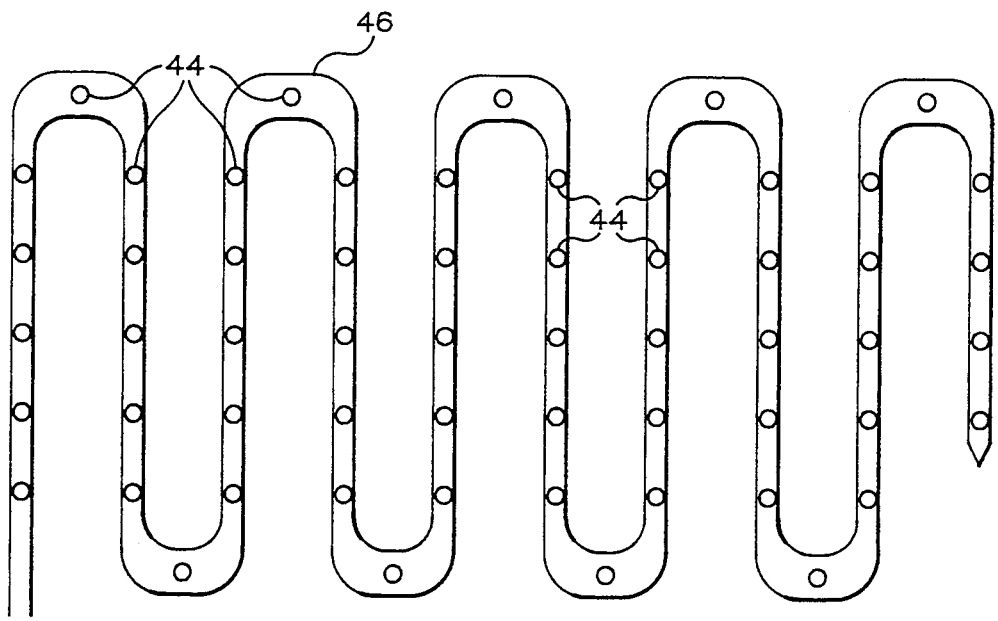
FIG. 4 is a detailed view of a perforated diffuser tube according to this invention.

Referring now to FIG. 4. There is illustrated a detail view of the perforated diffuser tubes 46 and 47 of FIG. 3 which preferably are constructed of stainless steel. The diffuser tubes 46 and 47 have perforations 44 of uniform size evenly distributed over the surface of the tubes 46 and 47.

In accordance with this invention a rigid laminated plastic sheet, reinforced with unidirectionally aligned fibers or alternatively a sheet of woven fibers, is passed through the annealing chamber 40 where the laminate is annealed under a spray of hot air. The laminate is subjected to a temperature and time cycle wherein the temperature is at or above the temperature known as the glass transition temperature or equivatently the previously mentioned second order transitional temperature where amorphous regions in the partially crystalline polymer change from a rubbery condition to a hard and relatively brittle condition. As used herein, the glass transition temperature refers to a temperature range where the reversible change occurs in an amorphous region of a partially crystalline polymer.

In this manner the polymer is subjected to a temperature in the annealing chamber 40 such that the polymer matrix is heated to a temperature which is at or above its glass transition temperature and below its melting point temperature for a length of time necessary to increase the crystalline level of the laminate to a desired crystalline level. This is accomplished while the laminated sheet is being continuously drawn through the annealing chamber 40 by pulling device 60 as previously described.

EXAMPLE

This example demonstrates that the use of the present invention provides for the on-line production of pultruded thermoplastic laminated sheets which exhibit a considerably greater level of crystallinity compared to pultruded sheets without the use of the annealing step of this invention.

A pultrusion system similar to that of FIG. 2 was used. Dies were selected to produce a laminated sheet containing carbon fibers. The feed was a 60 weight percent carbon fiber reinforced poly(phenylene sulfide) prepreg comprising a material form of unidirectional or woven fibers precoated with a controlled quantity of catalyzed resin formulation. The prepreg was made from a poly(phenylene sulfide) of the general type employed by processes disclosed in U.S. Pat. No. 3,919,177 the disclosure of which is incorporated in this disclosure by reference. Heated air was supplied via perforated tubes 46 and 47 to maintain annealing system temperatures. System temperatures were monitored at five points as follows: (a) near the exit end of a five-inch long heated die illustrated at 22, (b) near the entry end of an eight-inch long cold die which is illustrated in 24, (c) near the exit end of the eight-inch long cold die 24, (d) near the mid point of the annealing zone 48 (e), and near the exit end of the zone chamber 48. Line speed was seven inches per minute. Data are recorded in Table I illustrating two runs which were made under different annealing conditions.

As the data in Table I shows, pultruding without supplying heated air to the annealing zone 48, such as would be the case if no annealing chamber were used, produces a laminate (run No. 1) in which the laminate produced exhibits only 49 percent of the maximum level of crystallinity obtainable for the pultruded sheet. The maximum level of crystallinity was determined by a long time period oven annealing of similar laminates which were produced without on-line annealing. However, increasing the temperature of the atmosphere in annealing zone 48 by providing sufficient flow of heated air to maintain the indicated temperatures (run No. 2), produces a laminate with 100 percent of the maximum typical level of crystallinity obtainable in the laminate.

TABLE I

| Run No. | Percent Crystallinity[a] | Temperature °C.[b] | | | | |
|---|---|---|---|---|---|---|
| | | A | B | C | D | E |
| 1 | 49 | 375 | 169 | 91 | 73 | 32 |
| 2 | 100 | 375 | 170 | 157 | 201 | 162 |

[a]Determined by differential scanning calorimetry and expressed as a percentage of the maximum level of crystallinity observed in similar parts made without the on-line annealing chamber, and which were subsequently oven annealed for a longer period of time.
[b]A is temperature measured at thermocouple 30, shown in FIG. 2.
B is temperature measured at thermocouple 32, shown in FIG. 2.
C is temperature measured at thermocouple 34, shown in FIG. 2.
D is temperature measured at thermocouple 36, shown in FIG. 2.
E is temperature measured at thermocouple 38, shown in FIG. 2.

While this invention has been described in terms of specific temperatures for the purpose of illustration, it is not to be construed as limited thereby, but is intended to cover all changes and modifications within the spirit and scope of the invention.

That which is claimed is:

1. A process for improving the physical properties of a pultruded laminate of arylene sulfide polymer containing reinforcing filaments, said laminate being formed in a pultrusion machine including a cooling zone to set said laminate to a rigid form, said process comprising the step of annealing said rigid laminate in an apparatus comprising:

(a) a chamber attached to said cooling zone of said pultrusion machine for receiving and passing said rigid laminate therethrough, said chamber defining a heated annealing zone;

(b) means for pulling said rigid laminate through a central portion of said annealing zone;

(c) a first perforated diffuser tube having one end fixed to an end of said chamber above said rigid laminate and extending along a significant portion of the length of said chamber for flowing a gaseous heating medium over the top side of said rigid laminate so as to heat the top side of said rigid laminate to its glass transition temperature as it moves through said chamber; and (d) a second perforated diffuser tube having one end fixed to an end of said chamber below said rigid laminate and extending along a significant portion of the length of said annealing zone for flowing a gaseous heating medium over the under side of said rigid laminate so as to heat the underside of said rigid laminate to its glass transition temperature as it moves through said chamber.

2. A process in accordance with claim 1 wherein a source of heated air is supplied to said diffuser tube and further wherein said diffuser tubes comprise elongated tubes formed by a continuous serial arrangement of U-bend sections to form a generally sinusoidal shape.

3. A process in accordance with claim 1 wherein said rigid laminate is pulled at a rate of from about 4 inches per minute to about 120 inches per minute through said annealing zone while said annealing zone is maintained at a temperature in a range of about 93° C. to about 282° C.

4. A process in accordance with claim 1 wherein said rigid laminate is pulled at a rate of from about 4 inches per minute to about 120 inches per minute through said annealing zone while said annealing zone is maintained at a temperature in a range of about 110° C. to about 275° C.

5. A process in accordance with claim 1 wherein said rigid laminate is pulled at a rate of from about 4 inches per minute to about 10 inches per minute through said annealing zone while said annealing zone is maintained at a temperature in the range of about 110° C. to about 275° C.

6. A process in accordance with claim 1 wherein said rigid laminate prior to annealing has a crystallinity about 49 percent of the maximum crystallinity obtainable in a long term oven annealing, and wherein after on-line annealing said laminate has a crystallinity of about 100 percent of the maximum crystallinity obtainable in a long term oven annealing.

7. A process in accordance with claim 1 wherein said poly(phenylene sulfide) is prepared by the reaction of a polyhalo-substituted aromatic compounds with alkali metal sulfide.

* * * * *